(12) United States Patent
Koguma

(10) Patent No.: US 11,539,213 B2
(45) Date of Patent: Dec. 27, 2022

(54) MICROGRID POWER PLAN FOR OPTIMIZING ENERGY PERFORMANCE RESULTING FROM PROPORTIONAL PREDICTIVE DEMAND

(71) Applicant: IHI Corporation, Tokyo (JP)

(72) Inventor: Yuji Koguma, Tokyo (JP)

(73) Assignee: IHI Corporation, Tokyo (JP)

( * ) Notice: Subject to any disclaimer, the term of this patent is extended or adjusted under 35 U.S.C. 154(b) by 245 days.

(21) Appl. No.: 16/765,256

(22) PCT Filed: Nov. 14, 2018

(86) PCT No.: PCT/JP2018/042116
§ 371 (c)(1),
(2) Date: May 19, 2020

(87) PCT Pub. No.: WO2019/098235
PCT Pub. Date: May 23, 2019

(65) Prior Publication Data
US 2020/0358290 A1    Nov. 12, 2020

(30) Foreign Application Priority Data
Nov. 20, 2017  (JP) .............................. JP2017-223103

(51) Int. Cl.
*H02J 3/32*   (2006.01)
*G06Q 50/06*  (2012.01)
(Continued)

(52) U.S. Cl.
CPC .............. *H02J 3/381* (2013.01); *G06Q 50/06* (2013.01); *H02J 3/003* (2020.01); *H02J 3/004* (2020.01); *H02J 3/32* (2013.01); *H02J 2300/20* (2020.01)

(58) Field of Classification Search
None
See application file for complete search history.

(56) References Cited

U.S. PATENT DOCUMENTS 8,682,635 B2 * 3/2014 Sayyar-Rodsari ...... H02J 3/144
703/18
8,706,650 B2    4/2014 Ozog
(Continued)

FOREIGN PATENT DOCUMENTS

JP    2006-304402 A   11/2006
JP    4245583 B        3/2009
(Continued)

OTHER PUBLICATIONS

Luo et al., "A two-stage optimization and control for CCHP microgrid energy management", Nov. 2016, Applied Thermal Engineering 125 (2017) 513- 522. (Year: 2016).*
(Continued)

*Primary Examiner* — Mohammad Ali
*Assistant Examiner* — Kelvin Booker
(74) *Attorney, Agent, or Firm* — Volpe Koenig

(57) ABSTRACT

The energy management system is an energy management system for a microgrid including at least either one of an electrical load and a renewable energy power-generation system, and an energy storage device, the energy management system including: a prediction unit that predicts, at a fixed time interval, at least either one of an electricity demand and an amount of electricity generated from renewable energy, and an electricity fee, within a predetermined period; and an optimization unit that performs optimization for an optimum charging/discharging plan for the energy storage device by using a prediction result from the prediction unit and in consideration of uncertainty in prediction.

6 Claims, 6 Drawing Sheets

(51) Int. Cl.
*H02J 3/00* (2006.01)
*H02J 3/38* (2006.01)

(56) References Cited

U.S. PATENT DOCUMENTS

| | | | | |
|---|---|---|---|---|
| 2007/0185823 | A1* | 8/2007 | Chen | H02J 3/008 706/15 |
| 2009/0062969 | A1* | 3/2009 | Chandra | G06Q 10/06 700/291 |
| 2010/0179704 | A1* | 7/2010 | Ozog | H02J 13/0006 700/291 |
| 2011/0231028 | A1* | 9/2011 | Ozog | G06Q 50/06 700/291 |
| 2012/0130556 | A1* | 5/2012 | Marhoefer | G06Q 10/04 700/291 |
| 2012/0303351 | A1* | 11/2012 | Serrano Dorado | G05B 13/028 703/18 |
| 2013/0166084 | A1* | 6/2013 | Sedighy | G06Q 50/06 700/291 |
| 2014/0058571 | A1* | 2/2014 | Hooshmand | G05B 15/02 700/286 |
| 2014/0129040 | A1* | 5/2014 | Emadi | G06Q 50/06 700/291 |
| 2014/0172503 | A1* | 6/2014 | Hammerstrom | G05B 15/02 705/7.31 |
| 2014/0350743 | A1* | 11/2014 | Asghari | G05B 13/048 700/297 |
| 2015/0094968 | A1* | 4/2015 | Jia | G01R 21/133 702/60 |
| 2015/0310461 | A1* | 10/2015 | Lee | G06Q 10/04 705/412 |
| 2015/0316901 | A1* | 11/2015 | Wenzel | G05B 13/048 700/291 |
| 2016/0105140 | A1 | 4/2016 | Taniguchi et al. | |
| 2016/0118795 | A1* | 4/2016 | Berkowitz | H02J 3/1807 700/286 |
| 2016/0203569 | A1* | 7/2016 | Forbes, Jr. | G06Q 50/06 717/105 |
| 2017/0271915 | A1* | 9/2017 | Quinn | H02J 13/00028 |

FOREIGN PATENT DOCUMENTS

| | | | | | |
|---|---|---|---|---|---|
| JP | 2015-037355 | A | | 2/2015 | |
| JP | 201625792 | A | * | 2/2016 | H02J 3/00 |
| JP | 2016-042748 | A | | 3/2016 | |
| JP | 201632336 | A | * | 3/2016 | H02J 3/32 |
| JP | 201632337 | A | * | 3/2016 | H02J 3/38 |
| JP | 201640997 | A | * | 3/2016 | H02J 3/38 |
| JP | 2016-082617 | A | | 5/2016 | |
| KR | 10-1787538 | B1 | | 10/2017 | |

OTHER PUBLICATIONS

Marco et al., "Optimization of Configuration and Control of Energy Storage Systems Using ESWare(TM)", 2017, IHI Engineering Review, vol. 50, No. 1. (Year: 2017).*

Copp et al., "Adaptive Model Predictive Control for Real-Time Dispatch of Energy Storage Systems", 2019, SAND2019-4431C, US Department of Energy. (Year: 2019).*

Chen et al., "Smart energy management system for optimal microgrid economic operation", Mar. 2010, Published in IET Renewable Power Generation. (Year: 2010).*

* cited by examiner

MICROGRID POWER PLAN FOR OPTIMIZING ENERGY PERFORMANCE RESULTING FROM PROPORTIONAL PREDICTIVE DEMAND

TECHNICAL FIELD

The present disclosure relates to an energy management system, a power demand plan optimization method, and a power demand plan optimization program.

Priority is claimed on Japanese Patent Application No. 2017-223103, filed Nov. 20, 2017, the content of which is incorporated herein by reference.

BACKGROUND ART

As renewable energy power-generation systems such as photovoltaic power generation and hydroelectric power generation systems have become widespread, research on stabilization of power supply systems and reduction of costs incurred for supply of electricity by appropriately controlling energy storage devices such as storage batteries has been conducted. For example, in the field of research on charging/discharging plan optimization for an energy storage device using an energy management system (EMS) for a microgrid, there are many proposed methods in which a period from a current time point to a specific future time point is divided into a plurality of fixed time intervals, power demand from loads and an amount of renewable energy generation are each predicted for the fixed time intervals, the output and capacity of an energy storage device, the presence or absence of a reverse flow, contracted electricity, and the like are set as restricting conditions, and finally, a charging/discharging plan that is likely to minimize costs for operating the microgrid in every given period based on differences in electricity fees is obtained using a mathematical optimization method.

However, it is generally known that accurate prediction of electricity demand and an amount of renewable energy generation is inherently difficult. In particular, renewable energy is a source of electricity bearing high uncertainty in that amounts of energy generation are heavily affected by weather conditions. In photovoltaic power generation, for example, even a few clouds covering the sun can significantly change an amount of power generation.

Due to such uncertainty in prediction, executing charging and discharging as indicated by a charging/discharging plan that is obtained using the mathematical optimization method does not necessarily lead to minimized operation costs for a microgrid. In some cases, there is a possibility of the restricting conditions being breached, such as depletion of a remaining charge of an energy storage device, and an excess of contracted electricity, occurring due to uncertainty in prediction. For this reason, there is demand for development of a charging/discharging plan optimization technique that enables restricting conditions to be reliably met and operation costs for a microgrid to be lowered taking such uncertainty in prediction into account.

As related art for making an operation plan for an energy storage device taking uncertainty in prediction into account, for example, there is the technology disclosed in Patent Document 1. The decentralized energy system disclosed in Patent Document 1 assumes in advance a plurality of cases including not only a case in which prediction is correct but also a case of a prediction deviation in which a prediction deviates more than a certain degree at some point. In addition, the decentralized energy system disclosed in Patent Document 1 carries out a control operation simulation after the occurrence of a case of a prediction deviation to evaluate operation costs whenever a case of a prediction deviation occurs, and decides an operation plan that can minimize the weighted sum of the operation costs of each case (the weight of an occurrence probability of each case).

Document of Related Art
Patent Document
[Patent Document 1] Japanese Patent No. 4245583

SUMMARY OF INVENTION

Technical Problem

However, since a simulation needs to be performed whenever a case of a prediction deviation occurs in the technology disclosed in Patent Document 1, a lot of calculation time is needed to perform the simulation, which is a problem. For example, an operation plan for an energy storage device is frequently modified on a day when the weather often changes, a simulation is performed each time, and thus an enormous calculation time is required. In addition, if the operation plan for the energy storage device is frequently modified, performing a simulation may fail to keep up with the rate of change in weather, and thus it is difficult to modify the operation plan. As a result, the technology disclosed in Patent Document 1 has a problem of not being able to follow electricity charging and discharging to an optimum level to respond to a case in which electricity demand of loads or an amount of renewable energy generation rapidly change.

The present disclosure is made in view of the above-described circumstances, and an object is to provide an energy management system, a power demand plan optimization method, and a power demand plan optimization program that can make an operation plan in consideration of uncertainty in prediction in a shorter calculation time.

Solution to Problem

In order to solve the above problems, an energy management system of a first aspect of the present disclosure is an energy management system for a microgrid including at least either one of an electrical load and a renewable energy power-generation system, and an energy storage device, the energy management system including: a prediction unit that predicts, at a fixed time interval, at least either one of an electricity demand and an amount of electricity generated from renewable energy, and an electricity fee, within a predetermined period; and an optimization unit that performs optimization for an optimum charging/discharging plan for the energy storage device by using a prediction result from the prediction unit and in consideration of uncertainty in prediction.

In addition, in the energy management system of the first aspect of the present disclosure, the optimization unit may be configured to derive, at the fixed time interval through the optimization, the charging/discharging plan indicating an optimum amount of charged/discharged electricity for the energy storage device.

In addition, in the energy management system of the first aspect of the present disclosure, the optimization unit may be configured to derive, at the fixed time interval through the optimization, a predicted/actual difference compensation plan indicating a proportion of a predicted/actual difference in charging/discharging to be compensated in charging/discharging of the energy storage device.

In addition, a power demand plan optimization method of a second aspect of the present disclosure is a power demand plan optimization method performed by a computer for a microgrid including at least either one of an electrical load and a renewable energy power-generation system, and an energy storage device, the power demand plan optimization method including: a prediction step of predicting, at a fixed time interval, at least either one of an electricity demand and an amount of electricity generated from renewable energy, and an electricity fee, within a predetermined period; and an optimization step of performing optimization for an optimum charging/discharging plan for the energy storage device by using a prediction result from the prediction step and in consideration of uncertainty in prediction.

In addition, a power demand plan optimization program of a third aspect of the present disclosure is for a microgrid including at least either one of an electrical load and a renewable energy power-generation system, and an energy storage device, to cause a computer to execute: a prediction step of predicting, at a fixed time interval, at least either one of an electricity demand and an amount of electricity generated from renewable energy, and an electricity fee, within a predetermined period; and an optimization step of performing optimization for an optimum charging/discharging plan for the energy storage device by using a prediction result from the prediction step and in consideration of uncertainty in prediction.

Effects

According to the present disclosure, it is possible to make an operation plan in consideration of uncertainty in prediction in a shorter calculation time.

DESCRIPTION OF EMBODIMENTS

Embodiment

A microgrid according to an embodiment of the present disclosure will be described below.

[Overall Configuration of Microgrid]

An overall configuration of a microgrid 1 according to the present embodiment will be described below with reference to the drawings.

Figure 1:
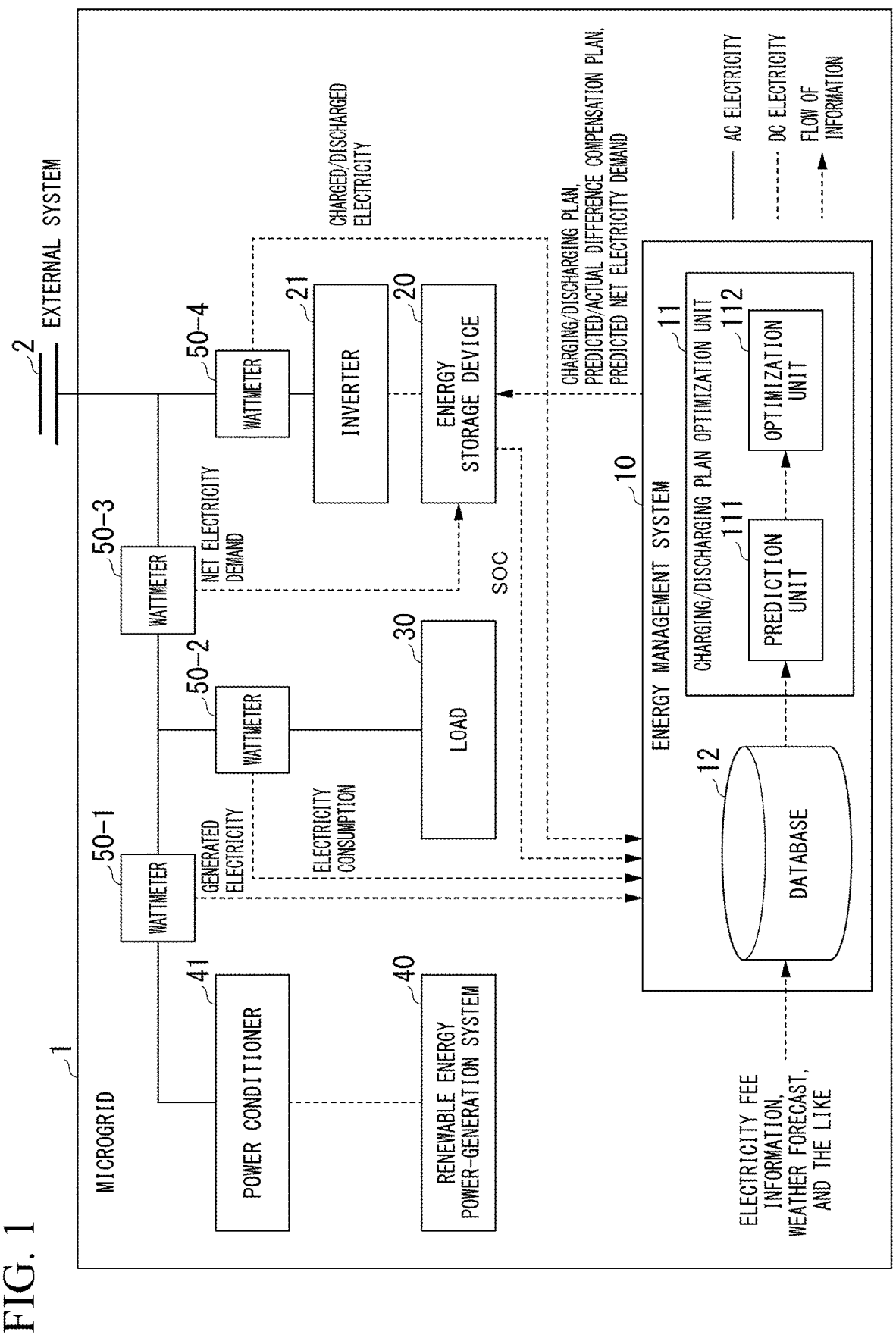
FIG. 1 is a system configuration diagram illustrating an overall configuration of a microgrid according to an embodiment of the present disclosure.

FIG. 1 is a system configuration diagram illustrating an overall configuration of the microgrid according to an embodiment of the present disclosure. The microgrid 1 includes an energy management system 10, at least one energy storage device 20 (e.g., a storage battery, or the like), and at least one load 30 (electrical load) and renewable energy power-generation system 40 as illustrated in FIG. 1. That is, the microgrid 1 may include only either of the load 30 or the renewable energy power-generation system 40, or both of the load 30 and the renewable energy power-generation system 40. In these cases, one or more loads 30 may be included, and one or more renewable energy power-generation systems 40 may be included. Note that, for simplicity of description, a configuration in which one each of the energy storage device 20, the load 30, and the renewable energy power-generation system 40 are included in the microgrid 1 will be described below.

The energy management system 10 mentioned here is a system for drawing up a charging/discharging plan of the energy storage device 20 to minimize operation costs of the microgrid 1.

The microgrid 1 to be managed by the energy management system 10 is connected to an external system 2 as illustrated in FIG. 1. In addition, the energy storage device 20 included in the microgrid 1 is connected to an AC power grid through an inverter 21. In addition, the load included in the microgrid 1 is connected to the AC power grid. Furthermore, the renewable energy power-generation system 40 included in the microgrid 1 is connected to the AC power grid through a power conditioner 41.

The energy management system 10 is constituted by a charging/discharging plan optimization unit 11 and a database 12 as illustrated in FIG. 1. In addition, the charging/discharging plan optimization unit 11 is constituted by a prediction unit 111 and an optimization unit 112.

Note that, the charging/discharging plan optimization unit 11 may include a processor, for example, a central processing unit (CPU), or the like.

The energy management system 10 receives information indicating generated electricity of the renewable energy power-generation system 40 from a wattmeter 50-1 included in the microgrid 1. In addition, the energy management system 10 receives information indicating electricity demand of the load from a wattmeter 50-2. Furthermore, the energy management system 10 receives information indicating charged/discharged electricity of the energy storage device 20 and information indicating a state-of-charge (SOC) of the energy storage device 20 from a wattmeter 50-4.

Note that, the energy management system 10 may receive information on electricity fees, information on weather forecasts, and the like from an external system.

The above-described various kinds of information that the energy management system 10 receives are stored in the database 12 and utilized in calculation for charging/discharging plan optimization as necessary. The energy management system 10 carries out optimization of a charging/discharging plan of the energy storage device 20 and transmits the charging/discharging plan and a predicted/actual difference compensation plan (which will be described below in detail) together with a predicted net electricity demand to the energy storage device 20.

Note that, the database 12 may be configured as, for example, a storage medium such as a hard disk drive (HDD), a flash memory, an electrically-erasable programmable read-only memory (EEPROM), a random access read/write memory (RAM), or a read-only memory (ROM), or any combination of these storage media.

In addition, the microgrid 1 includes a wattmeter 50-3 at a junction of a load from the load 30 and renewable energy from the renewable energy power-generation system 40 as illustrated in FIG. 1. A net electricity demand is measured by the wattmeter 50-3. The energy storage device 20 can refer to the measured (actual) net electricity demand and ascertain the predicted/actual difference from comparison of the net electricity demand with the predicted net electricity demand received from the energy management system 10.

[Operation of Energy Management System]

An operation of the energy management system 10 will be described below with reference to the drawings.

Figure 2:
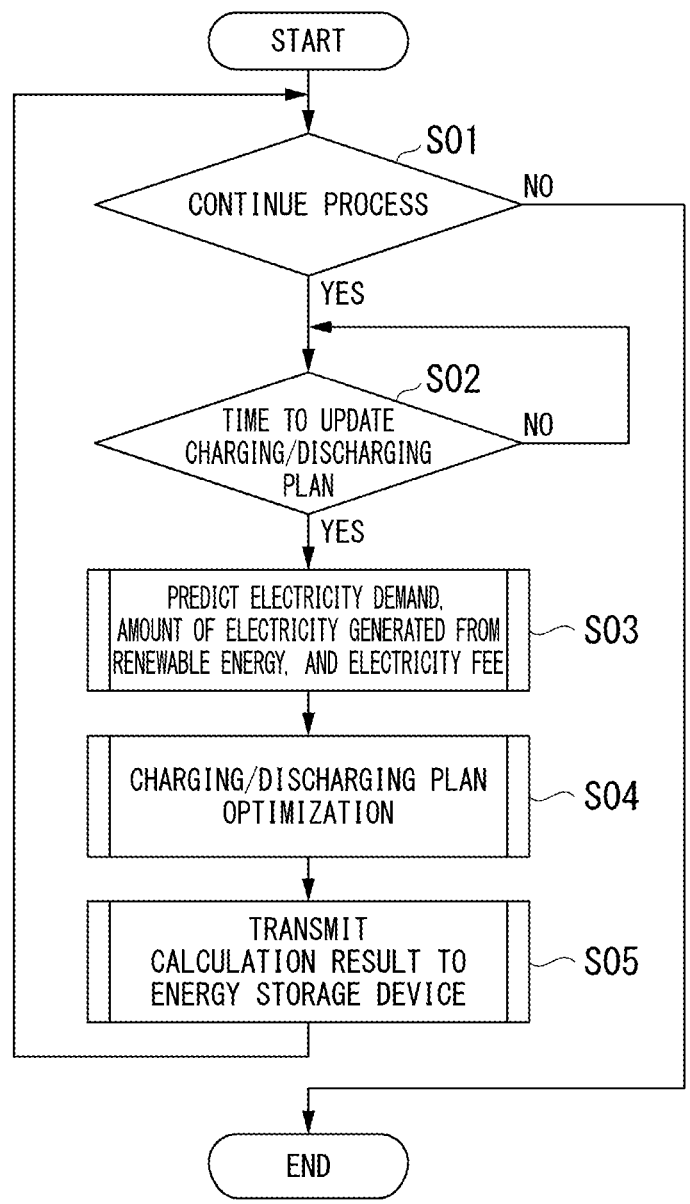
FIG. 2 is a flowchart showing an operation of an energy management system according to an embodiment of the present disclosure.

FIG. 2 is a flowchart showing an operation of the energy management system according to an embodiment of the present disclosure. The process shown in the present flowchart starts, for example, when a process of the energy management system 10 is started by turning on power to the energy management system.

(Step S01) If the process by the energy management system 10 continues (e.g., if the energy management system 10 has not received an instruction via an input of a user operation or the like to stop the process, or the like), the process proceeds to step S02. Otherwise, the process of the present flowchart ends.

(Step S02) If an update time for a charging/discharging plan has been reached, the process proceeds to step S03. Otherwise, the process stays at step S02. That is, step S02 is performed again.

(Step S03) The prediction unit 111 of the energy management system 10 performs (1) an electricity demand, an amount of electricity generated from renewable energy, and electricity fee prediction process (note that this prediction process will be described below in detail). Then, the process proceeds to step S04.

(Step S04) The optimization unit 112 of the energy management system 10 performs (2) a charging/discharging plan optimization process (note that this optimization process will be described below in detail). Then, the process proceeds to step S05.

(Step S05) The energy management system 10 transmits the calculation result obtained from the optimization process to the energy storage device 20. Then, the process returns to step S01.

The energy management system 10 performs optimization of a charging/discharging plan for the energy storage device 20 up to a certain time ahead (e.g., up to 24 hours ahead) periodically (e.g., every 15 minutes) and transmits information indicating the charging/discharging plan that is the optimization result to the energy storage device 20 as described above. Then, the energy storage device 20 performs charging/discharging, following the charging/discharging plan based on the information received from the energy management system 10.

The energy management system 10 performs the above-described "(1) electricity demand, amount of electricity generated from renewable energy, and electricity fee prediction process" and "(2) charging/discharging plan optimization process" using the charging/discharging plan optimization unit 11. These processes will be described below in detail.

[(1) Electricity demand, amount of electricity generated from renewable energy, and electricity fee prediction process]

The prediction unit 111 of the energy management system 10 divides a period of a certain time ahead (e.g., 24 hours ahead) into a plurality of certain periods (e.g., divides a period into intervals of 15 minutes) and predicts an electricity demand, an amount of electricity generated from renewable energy, and electricity fees for each of the certain periods (in units of timesteps).

Note that electricity fees include, for example, a pay-per-use electricity fee (Japanese yen/kWh), demand charge (Japanese yen/kW), a renewable energy electricity sales incentive (Japanese yen/kWh), and an electricity demand adjustment contribution incentive for stabilizing a system frequency (kW/Japanese yen), and the like.

The prediction unit 111 performs prediction using information stored in the database 12 and information received from an external system via the Internet or the like. As a simpler prediction method, for example, the prediction unit 111 calculates the average of performance values of the last 24 hours in the units of timesteps described above and sets the calculation result as a predicted value.

In addition, with respect to electricity demand and an amount of electricity generated from renewable energy, the prediction unit 111 calculates a covariance matrix between each timestep and another timestep of the timesteps, the covariance matrix indicating uncertainty of the predicted value, in addition to the predicted value. If a time interval is set to 15 minutes and a prediction period is set to 24 hours (1440 minutes), for example, the number of timesteps in the prediction period is 1440/15=96, and the covariance matrix is a 96×96 positive definite symmetric matrix.

In a case in which a predicted value greatly exceeds a performance value at the time of 12:00, it is assumed that a predicted value is very likely to exceed the performance value even at the time of the next timestep (e.g., 12:15) (it is at least very unlikely that the predicted value will be much below the performance value). As described above, the covariance matrix considers a correlation of the predicted/actual difference between timesteps.

[(2) Charging/Discharging Plan Optimization Process]

The optimization unit 112 of the energy management system 10 performs a process of solving a charging/discharging plan optimization problem considering uncertainty in prediction.

Note that, for simplicity of description, electricity costs include only a pay-per-use electricity fee (kWh-based cost) and a demand charge (kW-based cost) in the following description. In addition, as a restricting condition, only a condition for charged/discharged electricity and remaining charge of the energy storage device 20 is assumed.

Symbols used in the following description are summarized in Table 1 below.

TABLE 1

| No. | Symbol | Unit | Definition |
|---|---|---|---|
| 1 | $h$ | step | Timestep |
| 2 | $h_0$ | step | Timestep of starting point of plan |
| 3 | NT | hour | Time interval (duration of one timestep) |
| 4 | H | step | Period of plan |

TABLE 1-continued

| No. | Symbol | Unit | Definition |
|---|---|---|---|
| 5 | $p^*_{DC}(h)$ | kW | Charged/discharged electricity on inner side (DC side) of inverter of energy storage device at time h according to optimized charging/discharging plan (positive: charged/negative: discharged) |
| 6 | $p_{DC}(h)$ | kW | Actual charged/discharged electricity on inner side (DC side) of inverter of energy storage device that can be taken at time h (positive: charged/negative: discharged) |
| 7 | $p_{DCmin}(h)$ | kW | Lower limit of charged/discharged electricity $p_{DC}(h)$ |
| 8 | $p_{DCmax}(h)$ | kW | Upper limit of charged/discharged electricity $p_{DC}(h)$ |
| 9 | $p^*_{AC}(h)$ | kW | Charged/discharged electricity on outer side (AC side) of inverter of energy storage device at time h according to optimized charging/discharging plan (positive: charged/negative: discharged) |
| 10 | $p_{AC}(h)$ | kW | Actual charged/discharged electricity on outer side (AC side) of inverter of energy storage device that can be taken at time h, corresponding to $p_{DC}(h)$ (positive: charged/negative: discharged) |
| 11 | $q^*(h)$ | kWh | Remaining charge of energy storage device at time h according to optimized charging/discharging plan |
| 12 | $q(h)$ | kWh | Actual remaining charge of energy storage device that can be taken at time h |
| 13 | $q(h_0)$ | kWh | Remaining charge of energy storage device at starting point (time $h_0$) of plan |
| 14 | $q_{min}(h)$ | kWh | Lower limit of $q(h)$ |
| 15 | $q_{max}(h)$ | kWh | Upper limit of $q(h)$ |
| 16 | $l^*(h)$ | kW | Predicted value of net electricity demand at time h |
| 17 | $e^*(h)$ | kW | Incoming electricity from system at time h according to optimized charging/discharging plan (positive: incoming/negative: reverse flow) |
| 18 | $e(h)$ | kW | Actual incoming electricity from system that can be taken at time h (positive: incoming/negative: reverse flow) |
| 19 | $\eta$ | — | Conversion efficiency of AC-DC-AC of energy storage device ($0 < \eta < 1$) |
| 20 | $\alpha^*(h)$ | — | Predicted/actual difference compensation proportion of energy storage device at time h according to optimized charging/discharging plan ($0 \le \alpha^*(h) < 1$) (predicted/actual difference compensation plan) |
| 21 | $\omega_{AC}(h)$ | kW | Predicted/actual difference of net electricity consumption on outer side (AC side) of inverter at time h (positive: larger electricity consumption than predicted/negative: smaller electricity consumption than predicted) |
| 22 | $\omega_{DC}(h)$ | kW | Predicted/actual difference of net electricity consumption on inner side (DC side) of inverter at time h (positive: larger electricity consumption than predicted/negative: smaller electricity consumption than predicted) |
| 23 | $C \in \mathbb{R}^{H \times H}$ | $kW^2$ | Can be calculated with sum of covariance matrix for $\omega_{AC}(h)$, electricity demand, and covariance matrix for amount of electricity generated from renewable energy. |
| 24 | $C_{kwh}(h)$ | ¥/kWh | Pay-per-use electricity fee (more generally, electricity cost per kWh) |
| 25 | $C_{kw}(h)$ | ¥/kW | Demand charge (more generally, electricity cost per kW) |

Figure 3:
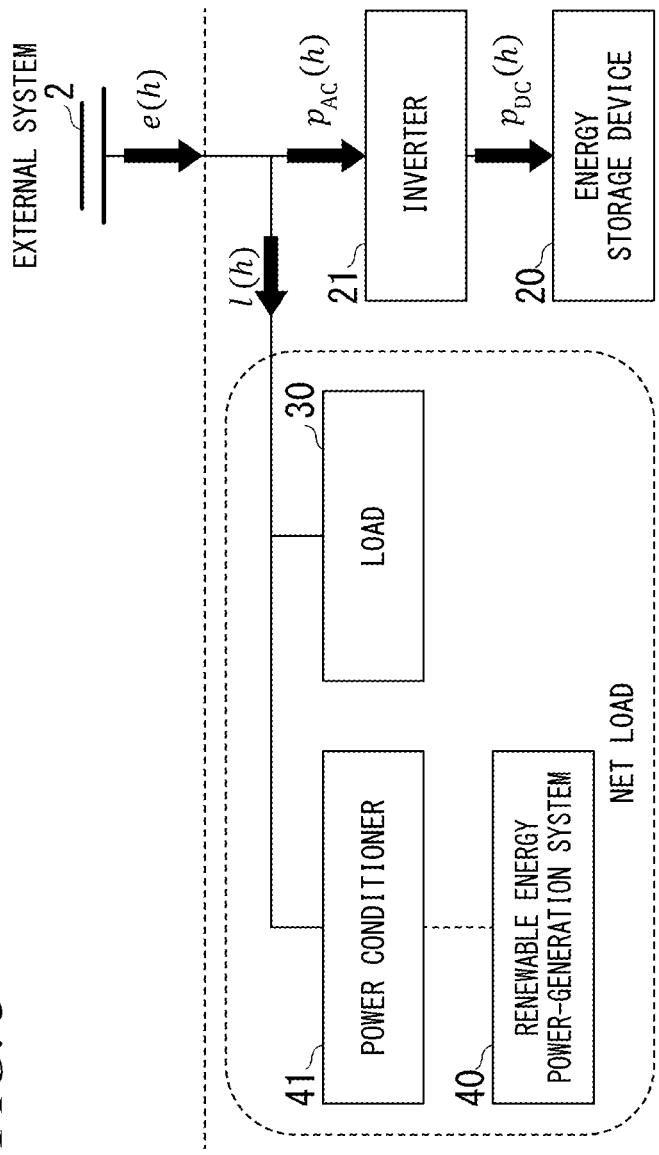
FIG. 3 is a diagram illustrating a correspondence relationship between electricity in the microgrid and symbols according to an embodiment of the present disclosure.

In addition, FIG. 3 is a diagram illustrating a correspondence relationship between electricity in the microgrid and symbols according to an embodiment of the present disclosure.

An optimization problem to be solved will be defined as below based on the symbols shown in Table 1. Note that, it is assumed that a predicted/actual difference $\omega_{AC}(h)$ follows the normal distribution N (0, C) of the average zero and the covariance C.

$$\underset{\{p^*_{DC}(h)\}_{h=h_0}^{h_0+H}, \{\alpha^*(h)\}_{h=h_0}^{h_0+H}}{\text{minimize}} \max_h \left( c_{kW}(h) \left( \mathbb{E}[e(h)] + n\sqrt{\mathbb{V}[e(h)]} \right) \right) + \sum_{h=h_0}^{h_0+H} \Delta T c_{kWh}(h) \mathbb{E}[e(h)] \; subj. \; to \quad (1)$$

$$Pr[p_{DCmin}(h) \le p(h) \le p_{DCmax}(h)] \le 1 - \varepsilon, \quad (2)$$

$$Pr[q_{min}(h) \le q(h+1) \le q_{max}(h)] \le 1 - \varepsilon, \quad (3)$$

$$0 \le \alpha^*(h) \le 1, \text{ where} \quad (4)$$

$$q^*(h+1) = q^*(h) + \Delta T p^*_{DC}(h), \quad (5)$$

$$e^*(h) = l^*(h) + p^*_{AC}(h), \quad (6)$$

$$p^*_{AC}(h) = \begin{cases} \sqrt{\eta} \, p^*_{DC}(h), & p^*_{DC}(h) < 0 \\ \dfrac{1}{\sqrt{\eta}} p^*_{DC}(h), & \text{otherwise} \end{cases}, \text{ and} \quad (7)$$

$$q(h+1) = q(h) + \Delta T p_{DC}(h), \quad (8)$$

$$p_{DC}(h) = p^*_{DC}(h) - \alpha^*(h) \omega_{DC}(h), \quad (9)$$

$$e(h) = l^*(h) + p^*_{AC}(h) + (1 - \alpha^*(h)) \omega_{AC}(h), \quad (10)$$

-continued $$\omega_{DC}(h) = \begin{cases} \sqrt{\eta}\,\omega_{AC}(h), & \omega_{AC}(h) < 0 \\ \dfrac{1}{\sqrt{\eta}}\omega_{AC}(h), & \text{otherwise} \end{cases} \quad (11)$$

$$h = h_0, \ldots, h_0 + H - 1$$

Values of the following (1) and (2) are obtained by solving the present optimization problem.

(1) An optimum amount of charged/discharged electricity $P_{DC}{}^*(h)$ of the energy storage device in each future timestep h ($h=h_0, \ldots, h_0+H-1$)

(2) A proportion of a predicted/actual difference to be compensated by charging/discharging of the energy storage device in each future timestep h ($h=h_0, \ldots, h_0+H-1$) ($0 \leq \alpha^*(h) \leq 1$) (predicted/actual difference compensation plan)

There are four points (a) to (d) of the present formulation as follows.

(a) A decision variable a*(h) indicating the proportion of "how much proportion a predicted/actual difference should be compensated by charging/discharging of the energy storage device when the predicted/actual difference is made" (predicted/actual difference compensation plan) has been introduced. Note that, when the predicted/actual difference is not compensated using the energy storage device, the predicted/actual difference leads to the predicted/actual difference of incoming electricity without change based on formula (10), and thus a situation may be created in which, for example, a great electricity peak occurs due to increasing operation costs of the microgrid caused by electricity received more than expected in a time slot rated with a high electricity fee and demand charges increase.

(b) Two models including a model of the cases in which fluctuation is shown as expected (formula (5) to formula (7)) and a model in which a predicted/actual difference is made and the difference is expected to be compensated by charging and discharging of the energy storage device (formula (8) to formula (11)) are considered at the same time.

(c) An objective function is defined using an expected value and a variance with respect to e(h). In formula (1), n (n>0) is a parameter for determining a degree of expected uncertainty, and the larger n is, the greater uncertainty is expected.

(d) Each of the restricting conditions (formula (2) and formula (3)) is a restricting condition for charged/discharged electricity and remaining charge of the energy storage device, and serves as a stochastic restriction such as "the probability of electricity deviating from a restricting condition is c or smaller."

The present optimization problem can be solved using a general-purpose mathematical optimization algorithm (e.g., a sequential quadratic programming method or a primal-dual interior point method, or the like) since the probabilities of the left sides of the restricting conditions (formula (2) and formula (3)) can be approximated as the following formula (12) to formula (17).

$$\mu_p(h) + n\sqrt{\sigma_p^2(h)} \leq p_{DCmax}(h), \; \mu_p(h) - n\sqrt{\sigma_p^2(h)} \geq p_{DCmin}(h) \quad (12)$$

$$\mu_q(h+1) - n\sqrt{\sigma_q^2(h+1)} \leq q_{max}(h+1), \quad (13)$$

$$\mu_q(h+1) - n\sqrt{\sigma_q^2(h+1)} \geq q_{min}(h+1) \text{ where}$$

$$\mu_p(h) = p_{DC}^*(h) + \alpha^*(h)\sqrt{\frac{C_{h,h}}{2\pi}}\left(\sqrt{\eta} - \frac{1}{\sqrt{\eta}}\right), \quad (14)$$

$$\sigma_p^2(h) = \frac{1}{\eta}(\alpha^*(h))^2 C_{h,h} \quad (15)$$

$$\mu_q(h+1) = q^*(h+1) + \frac{\Delta T}{\sqrt{2\pi}}\left(\sqrt{\eta} - \frac{1}{\sqrt{\eta}}\right)\sum_{k=h_0}^{h}\alpha^*(k)\sqrt{C_{k,k}} \quad (16)$$

$$\sigma_q^2(h+1) = \frac{1}{\eta}(\Delta T)^2 \sum_{k=h_0}^{h}\sum_{l=h_0}^{h}\alpha^*(k)\alpha^*(l)C_{k,l}. \quad (17)$$

$$h = h_0, \ldots, h_0 + H - 1$$

The above-mentioned n is a parameter for determining a degree of expected uncertainty, similarly to the above-described (c), and increasing n is equivalent to decreasing ε.

[Operation of Energy Storage Device]

The energy storage device 20 receives the charged/discharged electricity $P_{DC}{}^*(h)$ corresponding to each future timestep h ($h=h_0, \ldots, h_0+H-1$), the predicted/actual difference compensation plan α*(h), and predicted net electricity consumption from the energy management system 10, obtains the predicted/actual difference $\omega_{DC}(t)$ at an actual time t from a net electricity consumption measured by the wattmeter 50-4 using formula (11), sequentially determines charged/discharged electricity $P_{DC}(t)$ to satisfy the following formula (18), and controls the charging/discharging. However, h is set as a timestep corresponding to the actual time t.

$$P_{DC}(t) = P_{DC}(h) - \alpha^*(h)\omega_{DC}(t) \ldots \quad (18)$$

Examples of Charging/Discharging Plan Optimization Result

Figure 4:
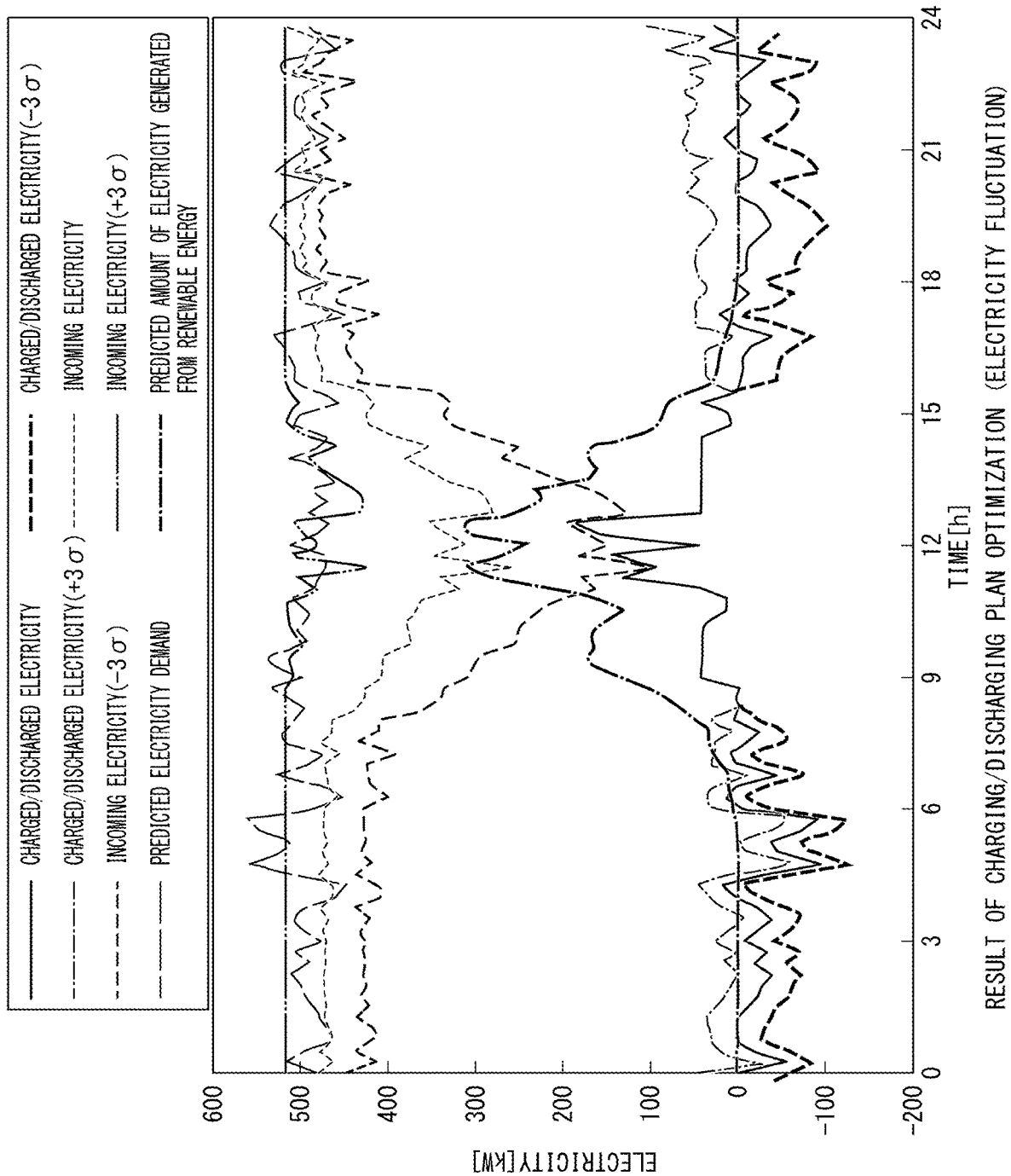
FIG. 4 is a diagram illustrating a charging/discharging plan optimization result (electricity fluctuation) of the energy management system according to an embodiment of the present disclosure.
Figure 5:
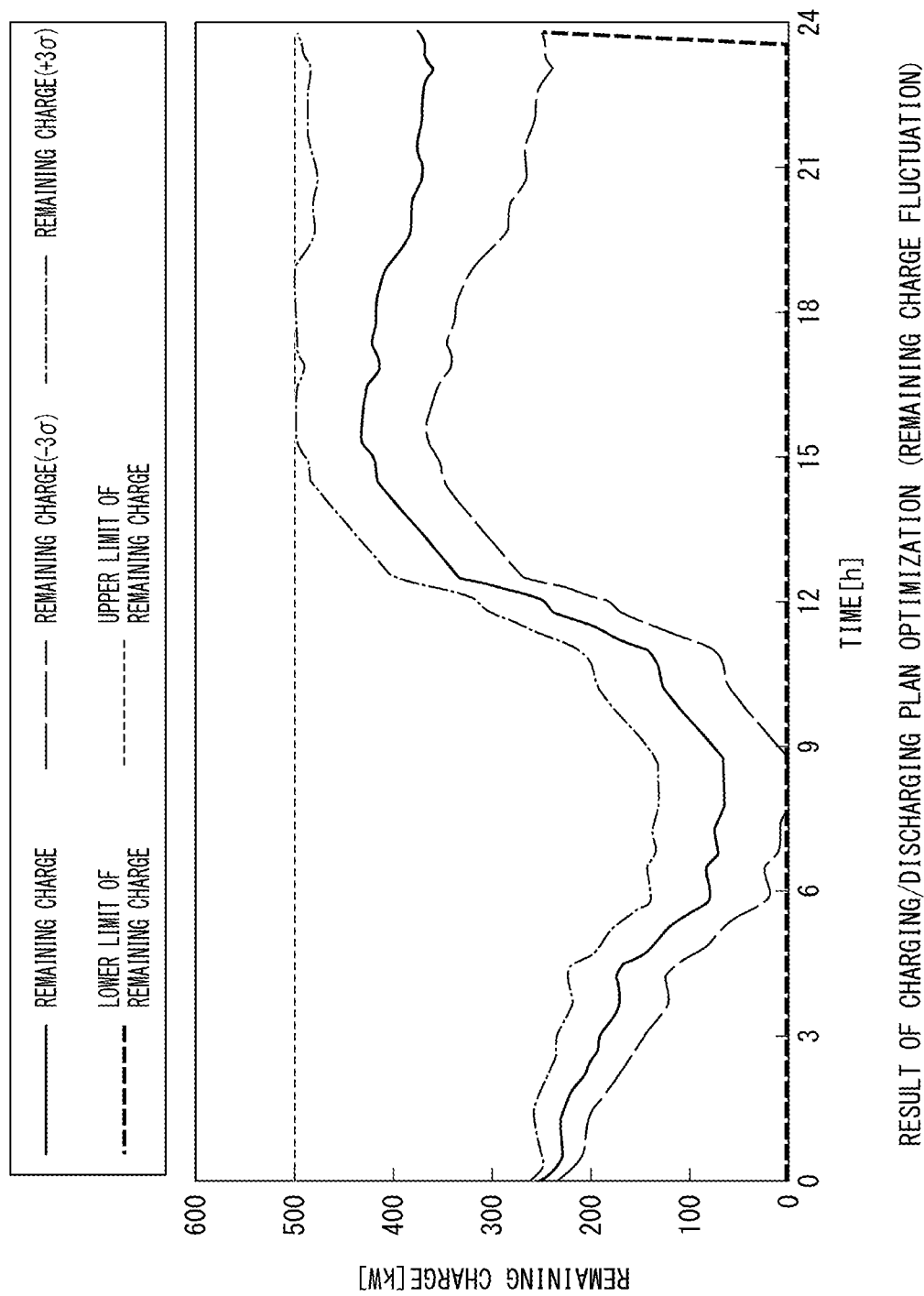
FIG. 5 is a diagram illustrating a charging/discharging plan optimization result (remaining charge fluctuation) of the energy management system according to an embodiment of the present disclosure.
Figure 6:
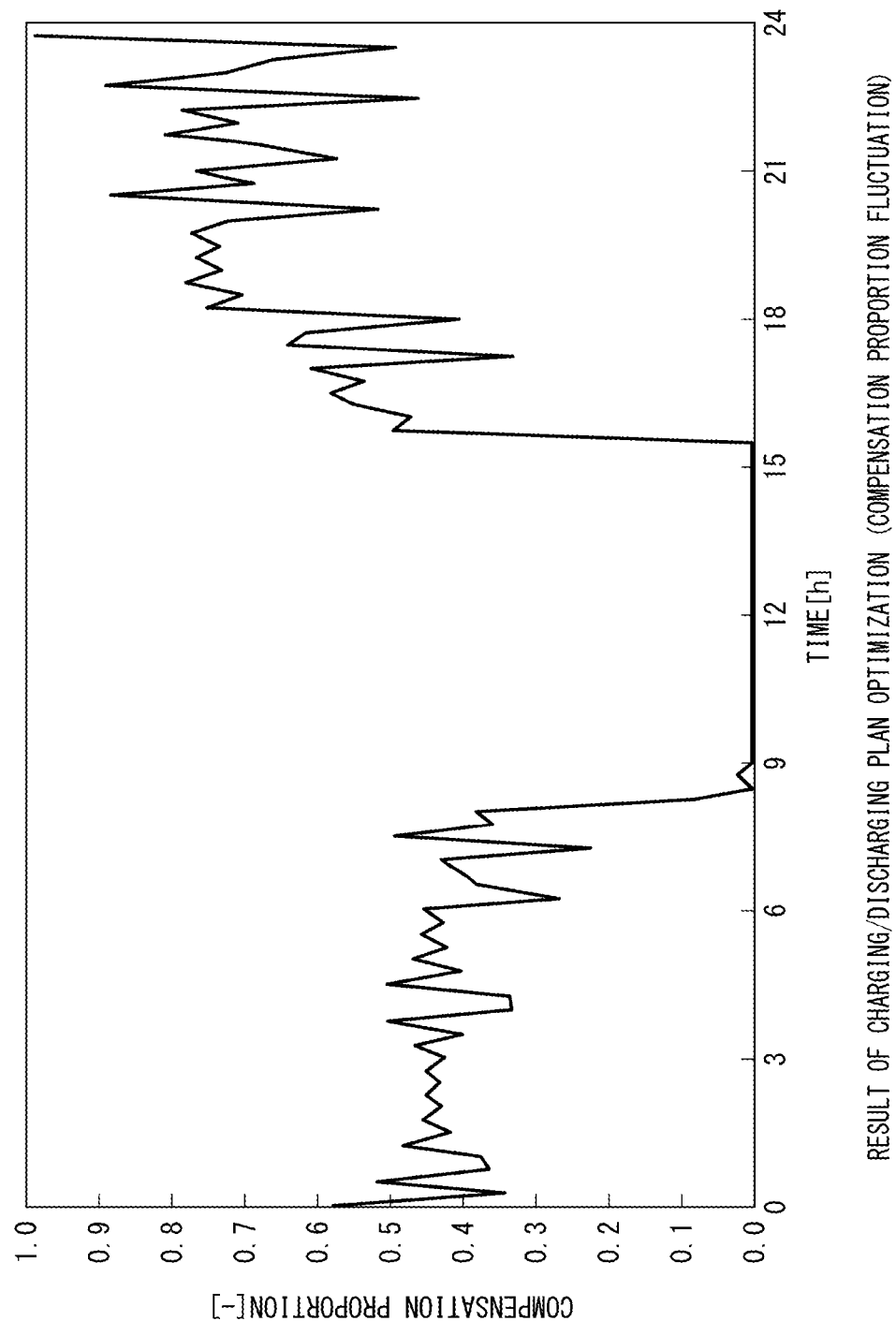
FIG. 6 is a diagram illustrating a charging/discharging plan optimization result (compensation proportion fluctuation) of the energy management system according to an embodiment of the present disclosure.

Examples of charging/discharging plan optimization obtained by applying the present disclosure are illustrated in FIG. 4 to FIG. 6.

FIG. 4 to FIG. 6 are diagrams illustrating charging/discharging plan optimization results of the energy management system according to an embodiment of the present disclosure. Note that, FIG. 4 is a diagram illustrating electricity fluctuation, FIG. 5 is a diagram illustrating remaining charge fluctuation, and FIG. 6 is a diagram illustrating compensation proportion fluctuation.

These diagrams illustrate examples of simulation results in a case in which a charging/discharging plan of the energy storage device 20 was optimized in 24 hours (15 minutes of one step and 96 steps) in one day in the microgrid 1 having the energy storage device 20, the load 30, and the renewable energy power-generation system 40.

Note that the following settings were made for each electricity fee.

For a pay-per-use electricity fee, the fee for the daylight hours (6:00 to 18:00) was set to be higher than that for other time slots such that the fee for the daylight hours was set to "20 Japanese yen/kWh," and the fee for the other time slots was set to "12 Japanese yen/kWh."

The demand charges were uniformly set to "1500 Japanese yen/kW" for all time slots.

The output of the energy storage device 20 was set to "250 kW" in both charging and discharging, and the capacity was set to "500 kWh." The remaining charge of the energy storage device 20 was set to "250 kW" that is half of full charge at the starting point of the plan (at the time of 0:00) and restricted to return to "250 kW" or more after 24 hours.

An electricity demand of a load and electricity generated from renewable energy were set to have uncertainty, and each drawing from FIG. 4 to FIG. 6 illustrates a series of cases in which an amount affected by such uncertainty has deviated ±3σ from an amount of the optimization plan. Particularly for charged/discharged electricity and remaining charge, plans in which restrictions can be complied with even though there is a predicted/actual difference of ±3σ have been obtained as illustrated in FIG. 4 and FIG. 5.

In the present optimization results, a charging/discharging plan in which the uncertainty of ±3σ is expected and operation costs (here, charged electricity fee and demand charges are assumed) of the microgrid 1 are minimized has been created. In the case of the microgrid 1, due to effects of the renewable energy generation, the net electricity demand tends to be high in the morning and at night and low in the afternoon. The following features (X) and (Y) of the obtained charging/discharging plan can be seen from the tendency and the compensation proportion fluctuation shown in FIG. 6.

(X) For the predicted/actual difference in time slots in the morning and at night, a strategy of actively performing charging/discharging the energy storage device 20 is applied (the value of the compensation proportion $\alpha^*(h)$ is large). The reason for this is that the demand charges are reduced.

(Y) For the predicted/actual difference in the time slots in afternoon, a strategy of not performing compensation using the energy storage device is applied (the compensation proportion $\alpha^*(h)=0$). The reason for this is that incoming electricity is small, which does not lead to a reduction in demand charges even though the predicted/actual difference is dealt with charging/discharging of the energy storage device 20. In addition, if charging/discharging is performed in the time slots, uncertainty in remaining charge in the time slots at night with a high net electricity demand increases (the width of ±3σ expands), the degree of freedom in charging/discharging decreases, and thus the strategy is set to avoid the above disadvantages.

According to the energy management system 10 of the present embodiment, not only an optimum charging/discharging plan of the energy storage device 20 taking uncertainty into consideration but also an operation rule of how to control the energy storage device 20 when there is a predicted/actual difference are obtained as described above.

OTHER EMBODIMENTS

[1] An objective function may be freely set taking electricity systems to which it is applied into consideration. For example, an optimization problem with the objective function such as the following (1-1) and (1-2) can be considered.

(1-1) Objective function for smoothing incoming electricity (reducing change in incoming electricity in two consecutive steps)

$$\underset{\{p^*(h)\}_{h=h_0}^{h_0+H},\{\alpha^*(h)\}_{h=h_0}^{h_0+H}}{\text{minimize}} \sum_{h=h_0}^{h_0+H} (\Delta T)^2 (\mathbb{E}[e(h+1)] - \mathbb{E}[e(h)])^2 \quad (19)$$

(1-2) Objective function for maximizing a demand adjustment reserve capacity (minimizing charged/discharged electricity of a storage battery according to the plan)

$$\underset{\{p^*(h)\}_{h=h_0}^{h_0+H},\{\alpha^*(h)\}_{h=h_0}^{h_0+H}}{\text{maximize}} \sum_{h=h_0}^{h_0+H} (\Delta T\mathbb{E}[p_{DC}(h)])^2 \quad (20)$$

Note that an objective function can be defined by appropriately combining the above-described pay-per-use electricity fee, demand charges, and the objective function formulas (formula (19) to formula (20)) (by taking the weighted sum). Note that, in a case in which an objective function to be maximized like formula (20) is combined with an objective function to be minimized, the maximization problem may be transformed into a minimization problem by applying a negative weight.

[2] A covariance matrix indicating uncertainty may use an appropriate diagonal matrix when there is not information on uncertainty. For example, if a difference of ±50 kW between an electricity demand and a load of about 500 kW is expected at each time, a diagonal matrix of a covariance matrix may be set to $(50 \text{ kW})^2 = 2500 \text{ kW}^2$.

[3] In a case in which uncertainty exists in prediction with respect to electricity fees as well, a covariance matrix is introduced similarly to net electricity consumption, and conservative optimization (in terms of costs) may be performed. In order for conservative calculation, for example, in formula (1) for the formulation of the above-described optimization problem, $C_{kW}(h)$ and $C_{kWh}(h)$ may be applied as in the following formula (21) and formula (22), respectively.

$$\mathbb{E}[c_{kW}(h)(h)] + n\sqrt{\mathbb{V}[c_{kW}(h)]} \ldots \quad (21)$$

$$\mathbb{E}[c_{kW}(h)(h)] + n\sqrt{\mathbb{V}[c_{kW}(h)]} \ldots \quad (22)$$

[4] The formulation of the above-described optimization problem is an example, and it can be transformed into an equivalence problem (and an easy-to-solve problem). For example, a method of introducing a new decision variable y, then transforming an objective function into the formula (23) shown below, and adding formula (24) shown below as a restricting condition is considered (note that the following describes formulation emphasizing intuition of formulas).

$$\underset{\{p^*_{DC}(h)\}_{h=h_0}^{h_0+H},\{\alpha^*(h)\}_{h=h_0}^{h_0+H},y}{\text{minimize}} y + \sum_{h=h_0}^{h_0+H} \Delta T c_{kWh}(h)\mathbb{E}[e(h)] \quad (23)$$

$$c_{kW}(h)(\mathbb{E}[e(h)] + n\sqrt{\mathbb{V}[e(h)]}) \leq y, h = h_0, \ldots, h_0 + H - 1. \quad (24)$$

[5] Formulation for a microgrid including a plurality of energy storage devices 20 is also possible by adopting a similar approach to the formulation of the above-described optimization problem, and the present disclosure can be applied thereto. Note that the plurality of energy storage devices 20 may have different capacities and outputs.

According to the microgrid 1 and the energy management system 10 of an embodiment of the present disclosure, if an optimization problem directly taking operation rules of the energy storage device with uncertainty in prediction and incorrect prediction into account is directly solved as described above, a simulation becomes unnecessary and a calculation time is shortened. In addition, according to the present disclosure, as a by-product of the calculation of the above-described optimization problem, an optimized value of a "proportion of a predicted/actual difference to be compensated by charging/discharging of the energy storage device" can be obtained. Thus, even when a sudden change occurs in electricity demands of loads or an amount of electricity generated from renewable energy (when a predicted/actual difference suddenly expands) immediately after planning, the charging/discharging plan can be updated keeping track of the change.

That is, a power demand plan optimization method according to the present disclosure is a method to solve an optimization problem, in which uncertainty in prediction is considered beforehand in the stage of solving the optimization problem, and a way of controlling the energy storage device when prediction deviates for recovery from the difference caused by the deviation is further considered. Thus, there is no need to assume a plurality of prediction deviation scenarios in advance or to perform a complicated simulation every time of the prediction deviation, and thus the effect of reducing a calculation time necessary for electricity demand plan optimization can be exhibited. In addition, as by-products of the calculation necessary for the electricity demand plan optimization, an optimum proportion of the predicted/actual difference in the amount of generated electricity to be absorbed by charging/discharging of the storage battery and the remaining proportion thereof to be absorbed by incoming electricity from an external system can be obtained. Therefore, an optimum operation for costs is possible.

As a general problem of a control system using an energy storage device such as a rechargeable battery, there is a case in which prediction often deviates even if charging/discharging of the energy storage device is controlled based on the prediction result, and thus charging/discharging is not appropriately controlled. In this case, which option between purchasing electricity in the amount of the gap between the prediction and the actual demand/supply from an external system and modifying the charging/discharging plan will be more appropriate depends on a time slot, an environment, and the like, as described above. Since the power demand plan optimization method according to the present disclosure aims at optimization reflecting such a case in which prediction deviates, the method has a characteristic of being able to derive a more robust charging/discharging plan.

Although the processing device according to an embodiment of the present disclosure has been described above, the present disclosure is not limited to the embodiment and can be freely modified within the scope of the present disclosure.

For example, a part (e.g., the charging/discharging plan optimization unit 11) or all of the energy management system 10 according to the above-described embodiment may be realized by a computer. In this case, a program for realizing the control function may be recorded in a computer-readable recording medium, and the program recorded in the recording medium may be read and executed by a computer system.

Note that, the "computer system" mentioned here is a computer system built in the energy management system 10 and includes hardware such as an OS, peripheral equipment, and the like. In addition, the "computer-readable recording medium" is a flexible disk, a magneto-optical disc, a ROM, a portable medium such as a CD-ROM, a hard disk built into the computer system, and a storage device such as a volatile/non-volatile memory. Such media are non-transitory tangible media.

Furthermore, the "computer-readable recording medium" may also include a medium dynamically holding a program for a short period of time, like a communication line in a case in which a program is transmitted via a network such as the Internet or a communication line such as a telephone line and a medium holding a program for a certain period of time, like a volatile memory inside a computer system serving as a server or a client in the above-described case. In addition, the program may be configured to realize a part of the above-described function or configured to be realized in a combination of the above-described function with a program recorded already in the computer system.

In addition, a part or all of the energy management system 10 according to the above-described embodiment may be realized as an integrated circuit in the form of large-scale integration (LSI), or the like. Each of the functional blocks of the energy management system 10 may be made into an individual processor or some or all of them may be integrated and made into a processor. In addition, an integrated circuit technique is not limited to LSI, and the functions may be realized by a dedicated circuit or a general-purpose processor. Furthermore, if an integrated circuit technology that can replace LSI emerges as semiconductor technologies advance, an integrated circuit using the technology may be used.

INDUSTRIAL APPLICABILITY

The present disclosure can be used for an energy management system, a power demand plan optimization method, and a power demand plan optimization program for microgrids.

DESCRIPTION OF REFERENCE SIGNS

1 Microgrid
2 External system
10 Energy management system
11 Charging/discharging plan optimization unit
12 Database
20 Energy storage device
21 Inverter
30 Load
40 Renewable energy power-generation system
41 Power conditioner
50-1 to 50-4 Wattmeter
111 Prediction unit
112 Optimization unit

What is claimed is:

1. An energy management system for a microgrid including at least either one of an electrical load and a renewable energy power-generation system, and an energy storage device, the energy management system comprising:

a prediction unit that predicts, each of timesteps obtained by dividing a period of time ahead into intervals, at least either one of an electricity demand and an amount of electricity generated from renewable energy, and an electricity fee, within a predetermined period, using at least information stored in a database, and that calculates a covariance matrix between each timestep and another timestep of the timesteps, the covariance matrix indicating uncertainty of a prediction result of the prediction unit; and an optimization unit that performs optimization for an optimum charging and discharging plan for the energy storage device by using the prediction result and in consideration of the covariance matrix and what proportion of a predicted and actual difference between the prediction result and an actual value of the at least either one of the electricity demand and the amount of electricity generated from renewable energy should be compensated for by charging and discharging of the energy storage device.

2. The energy management system according to claim 1, wherein the optimization unit is configured to derive, each of the timesteps through the optimization, the charging and discharging plan indicating an optimum amount of charged and discharged electricity for the energy storage device.

3. The energy management system according to claim 2, wherein the optimization unit is configured to derive, at each of the timesteps through the optimization, a predicted and actual difference compensation plan indicating a proportion of a predicted/actual the predicted and actual difference in charging/discharging charging and discharging to be compensated in charging/discharging charging and discharging of the energy storage device.

4. The energy management system according to claim 1, wherein the optimization unit is configured to derive, each of the timesteps through the optimization, a predicted and actual difference compensation plan indicating a proportion of the predicted and actual difference in charging and discharging to be compensated in charging and discharging of the energy storage device.

5. A power demand plan optimization method performed by a computer for a microgrid including at least either one of an electrical load and a renewable energy power-generation system, and an energy storage device, the power demand plan optimization method comprising:
  a prediction step of predicting, each of timesteps obtained by dividing a period of time ahead into intervals, at least either one of an electricity demand and an amount of electricity generated from renewable energy, and an electricity fee, within a predetermined period, using at least information stored in a database;
  a step of calculating a covariance matrix between each timestep and another timestep of the timesteps, the covariance matrix indicating uncertainty of a prediction result of the prediction step; and
  an optimization step of performing optimization for an optimum charging and discharging plan for the energy storage device by using the prediction result and in consideration of the covariance matrix and what proportion of a predicted and actual difference between the prediction result and an actual value of the at least either one of the electricity demand and the amount of electricity generated from renewable energy should be compensated for by charging and discharging of the energy storage device.

6. A non-transitory computer-readable recording medium storing a power demand plan optimization program for a microgrid including at least either one of an electrical load and a renewable energy power-generation system, and an energy storage device, the program being to cause a computer to execute:
  a prediction step of predicting, at each of timesteps obtained by dividing a period of time ahead into intervals, at least either one of an electricity demand and an amount of electricity generated from renewable energy, and an electricity fee, within a predetermined period, using at least information stored in a database;
  a step of calculating a covariance matrix between each timestep and another timestep of the timesteps, the covariance matrix indicating uncertainty of a prediction result of the prediction step; and
  an optimization step of performing optimization for an optimum charging and discharging plan for the energy storage device by using the prediction result and in consideration of the covariance matrix and what proportion of a predicted and actual difference between the prediction result and an actual value of the at least either one of the electricity demand and the amount of electricity generated from renewable energy should be compensated for by charging and discharging of the energy storage device.

* * * * *